United States Patent
Generale et al.

(10) Patent No.: US 11,371,360 B2
(45) Date of Patent: Jun. 28, 2022

(54) COMPONENTS FOR GAS TURBINE ENGINES

(71) Applicant: United Technologies Corporation, Farmington, CT (US)

(72) Inventors: Adam P. Generale, Dobbs Ferry, NY (US); Dominic J. Mongillo, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 16/432,214

(22) Filed: Jun. 5, 2019

(65) Prior Publication Data

US 2020/0386103 A1 Dec. 10, 2020

(51) Int. Cl.
 *F01D 5/18* (2006.01)
(52) U.S. Cl.
 CPC ............ *F01D 5/186* (2013.01); *F01D 5/188* (2013.01); *F01D 5/189* (2013.01); *F05D 2220/32* (2013.01); *F05D 2240/301* (2013.01); *F05D 2240/303* (2013.01); *F05D 2260/201* (2013.01);
 (Continued)
(58) Field of Classification Search
 CPC . F01D 5/186; F01D 5/18; F01D 5/188; F01D 5/189; F05D 2260/201; F05D 2260/22141
 See application file for complete search history.

(56) References Cited

U.S. PATENT DOCUMENTS

| | | | | |
|---|---|---|---|---|
| 3,301,527 A | * | 1/1967 | Kercher | F01D 5/189 415/115 |
| 5,328,331 A | * | 7/1994 | Bunker | F01D 5/187 415/115 |

(Continued)

FOREIGN PATENT DOCUMENTS

| | | |
|---|---|---|
| EP | 0543627 B1 | 9/1996 |
| EP | 3133242 A1 | 2/2017 |
| EP | 3438411 A1 | 2/2019 |

OTHER PUBLICATIONS

European Search Report for European Application No. 20178294.3, International Filing Date Jun. 4, 2020, dated Aug. 24, 2020, 10 pages.

*Primary Examiner* — Courtney D Heinle
*Assistant Examiner* — Andrew J Marien
(74) *Attorney, Agent, or Firm* — Cantor Colburn LLP (57) ABSTRACT

Component for gas turbine engines are described. The components include an airfoil body having leading and trailing edges and pressure and suction sides. The airfoil has a leading edge cavity located proximate the leading edge defined between the leading edge and a separator rib and between the pressure side and the suction side. An insert member is installed within the leading edge cavity. The insert member has one or more metering flow apertures at an aft end and one or more impingement apertures at a forward end and at least one axially extending rib along an exterior surface thereof. At least one axial extending flow channel passage is defined along the axial extending rib between an exterior of the insert member and an interior of the airfoil body. Air flow through the metering flow apertures flows into the axial extending flow channel passage and flows forward toward the leading edge.

16 Claims, 7 Drawing Sheets

(52) U.S. Cl.
CPC ......... *F05D 2260/202* (2013.01); *F05D 2260/22141* (2013.01); *F05D 2300/6033* (2013.01)

(56) References Cited

U.S. PATENT DOCUMENTS

| | | | | |
|---|---|---|---|---|
| 5,340,274 | A * | 8/1994 | Cunha | F02C 6/18 |
| | | | | 415/115 |
| 5,695,321 | A * | 12/1997 | Kercher | F01D 5/187 |
| | | | | 416/97 R |
| 6,290,462 | B1 * | 9/2001 | Ishiguro | F01D 5/187 |
| | | | | 416/97 R |
| 6,406,260 | B1 * | 6/2002 | Trindade | F01D 5/187 |
| | | | | 415/115 |
| 8,608,430 | B1 * | 12/2013 | Liang | F01D 5/187 |
| | | | | 415/115 |
| 9,334,755 | B2 * | 5/2016 | Riley | F01D 5/187 |
| 9,850,763 | B2 * | 12/2017 | Itzel | F01D 9/041 |
| 10,006,295 | B2 | 6/2018 | Spangeler et al. | |
| 2002/0090294 | A1 * | 7/2002 | Keith | F01D 5/189 |
| | | | | 415/115 |
| 2003/0049127 | A1 * | 3/2003 | Tiemann | F01D 5/189 |
| | | | | 416/97 R |
| 2014/0060084 | A1 * | 3/2014 | Gregg | F04D 29/542 |
| | | | | 60/806 |
| 2015/0198050 | A1 * | 7/2015 | Lee | F01D 9/041 |
| | | | | 415/115 |
| 2016/0102563 | A1 * | 4/2016 | Spangler | F01D 5/188 |
| | | | | 415/115 |
| 2018/0274377 | A1 | 9/2018 | Kington et al. | |
| 2019/0153875 | A1 * | 5/2019 | Kreitzer | F01D 9/02 |
| 2019/0316472 | A1 * | 10/2019 | Xu | F01D 9/041 |
| 2020/0131914 | A1 * | 4/2020 | Lee | F01D 9/041 |

\* cited by examiner

COMPONENTS FOR GAS TURBINE ENGINES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The compressor and turbine sections are typically subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, components for gas turbine engines are provided. The components include an airfoil body having a leading edge, a trailing edge, a pressure side, and a suction side, wherein the airfoil defines at least a leading edge cavity located proximate the leading edge and defined between the leading edge and a separator rib in an axial direction and between the pressure side and the suction side in a circumferential direction, an insert member installed within the leading edge cavity, the insert member having one or more metering flow apertures at an aft end and one or more impingement apertures at a forward end, and at least one axially extending rib extending along an exterior surface of the insert member from the aft end to the forward end of the insert member. At least one axial extending flow channel passage is defined along the at least one axial extending rib between the exterior surface of the insert member and an interior surface of the airfoil body and extending from the aft end to the forward end in an axial direction, and air flow through the one or more metering flow apertures flows into the at least one of the axial extending flow channel passage and flow forward toward the leading edge of the airfoil body.

In addition to one or more of the features described above, or as an alternative, further embodiments of the components may include a plurality of additional axial extending ribs arranged on the exterior surface of the insert member, wherein a plurality of additional axial extending flow channel passages are defined between adjacent axial extending ribs.

In addition to one or more of the features described above, or as an alternative, further embodiments of the components may include at least one heat transfer augmentation feature formed on the exterior surface of the insert member and within the at least one axial extending flow channel passage.

In addition to one or more of the features described above, or as an alternative, further embodiments of the components may include that each axial extending rib has a variable radial height in a direction from the aft end to the forward end.

In addition to one or more of the features described herein, or as an alternative, further embodiments of the components may include that the airfoil body is formed of ceramic matrix composites.

In addition to one or more of the features described above, or as an alternative, further embodiments of the components may include at least one film cooling aperture formed on the airfoil body to fluidly connect the leading edge portion to an exterior of the airfoil body.

In addition to one or more of the features described above, or as an alternative, further embodiments of the components may include that the insert member is a baffle inserted into the airfoil body.

In addition to one or more of the features described above, or as an alternative, further embodiments of the components may include that the insert member is a structural spar inserted into the airfoil body.

In addition to one or more of the features described above, or as an alternative, further embodiments of the components may include that the insert member is integrally formed with a platform.

In addition to one or more of the features described above, or as an alternative, further embodiments of the components may include that the insert member is formed from sheet metal.

According to some embodiments, gas turbine engines are provided. The gas turbine engines include an airfoil having an airfoil body defining a leading edge, a trailing edge, a pressure side, and a suction side, wherein the airfoil defines at least a leading edge cavity located proximate the leading edge and defined between the leading edge and a separator rib in an axial direction and between the pressure side and the suction side in a circumferential direction, an insert member installed within the leading edge cavity, the insert member having one or more metering flow apertures at an aft end and one or more impingement apertures at a forward end, and at least one axially extending rib extending along an exterior surface of the insert member from the aft end to the forward end. At least one axial extending flow channel passage is defined along the at least one axial extending rib between the exterior surface of the insert member and an interior surface of the airfoil body and extending from the aft end to the forward end in an axial direction, and wherein airflow through the one or more metering flow apertures flows into the at least one of the axial extending flow channel passage and flow forward toward the leading edge of the airfoil body.

In addition to one or more of the features described above, or as an alternative, further embodiments of the gas turbine engines may include a plurality of additional axial extending ribs arranged on the exterior surface of the insert member, wherein a plurality of additional axial extending flow channel passages are defined between adjacent axial extending ribs.

In addition to one or more of the features described above, or as an alternative, further embodiments of the gas turbine engines may include at least one heat transfer augmentation feature formed on the exterior surface of the insert member and within the at least one axial extending flow channel passage.

In addition to one or more of the features described above, or as an alternative, further embodiments of the gas turbine engines may include that each axial extending rib has a variable radial height in a direction from the aft end to the forward end.

In addition to one or more of the features described above, or as an alternative, further embodiments of the gas turbine engines may include that the airfoil body is formed of ceramic matrix composites.

In addition to one or more of the features described above, or as an alternative, further embodiments of the gas turbine engines may include at least one film cooling aperture formed on the airfoil body to fluidly connect the leading edge portion to an exterior of the airfoil body.

In addition to one or more of the features described above, or as an alternative, further embodiments of the gas turbine engines may include that the insert member is a baffle inserted into the airfoil body.

In addition to one or more of the features described above, or as an alternative, further embodiments of the gas turbine engines may include that the insert member is a structural spar inserted into the airfoil body.

In addition to one or more of the features described above, or as an alternative, further embodiments of the gas turbine engines may include that the insert member is integrally formed with a platform.

In addition to one or more of the features described above, or as an alternative, further embodiments of the gas turbine engines may include that the insert member is formed from sheet metal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
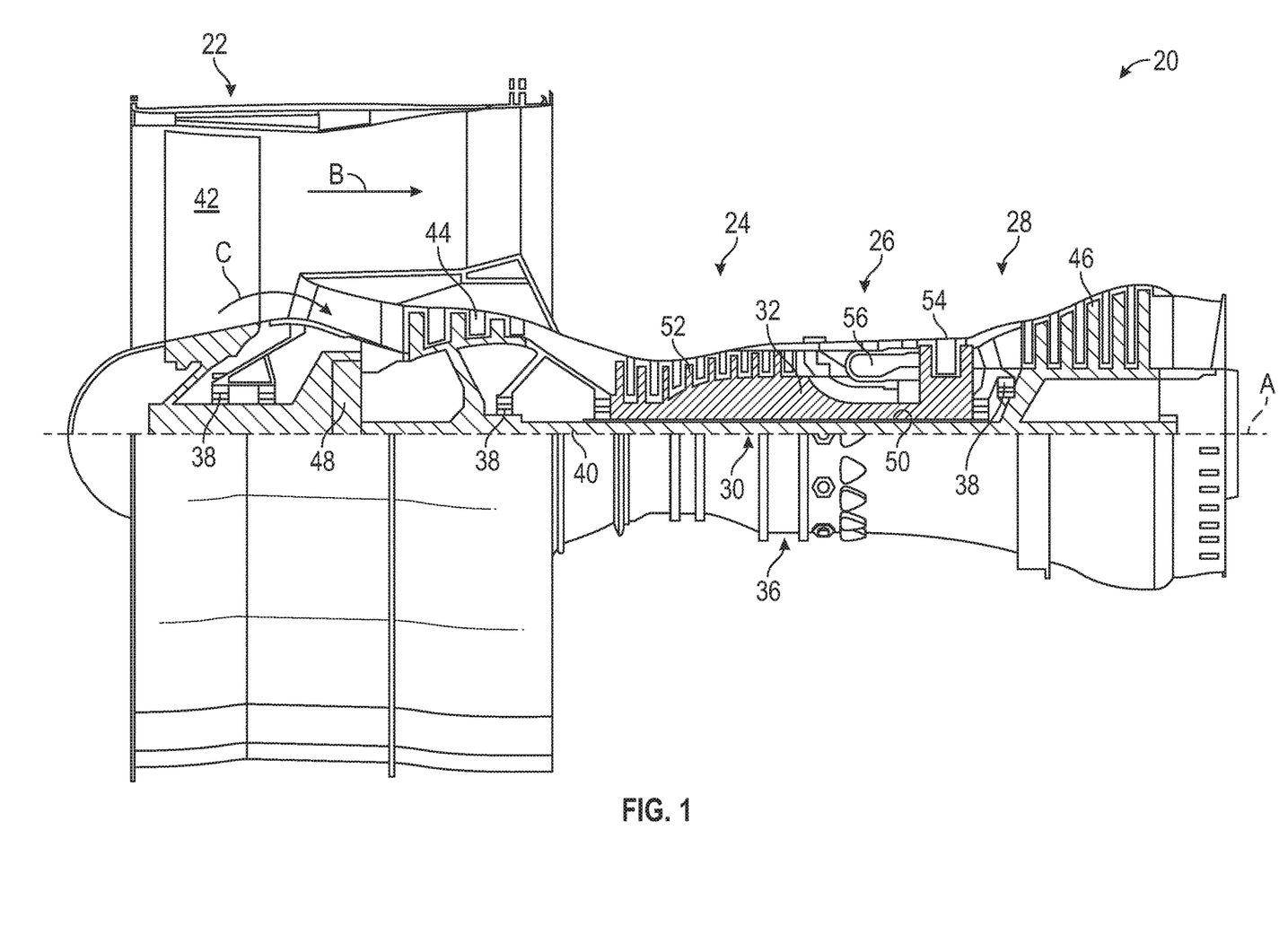
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
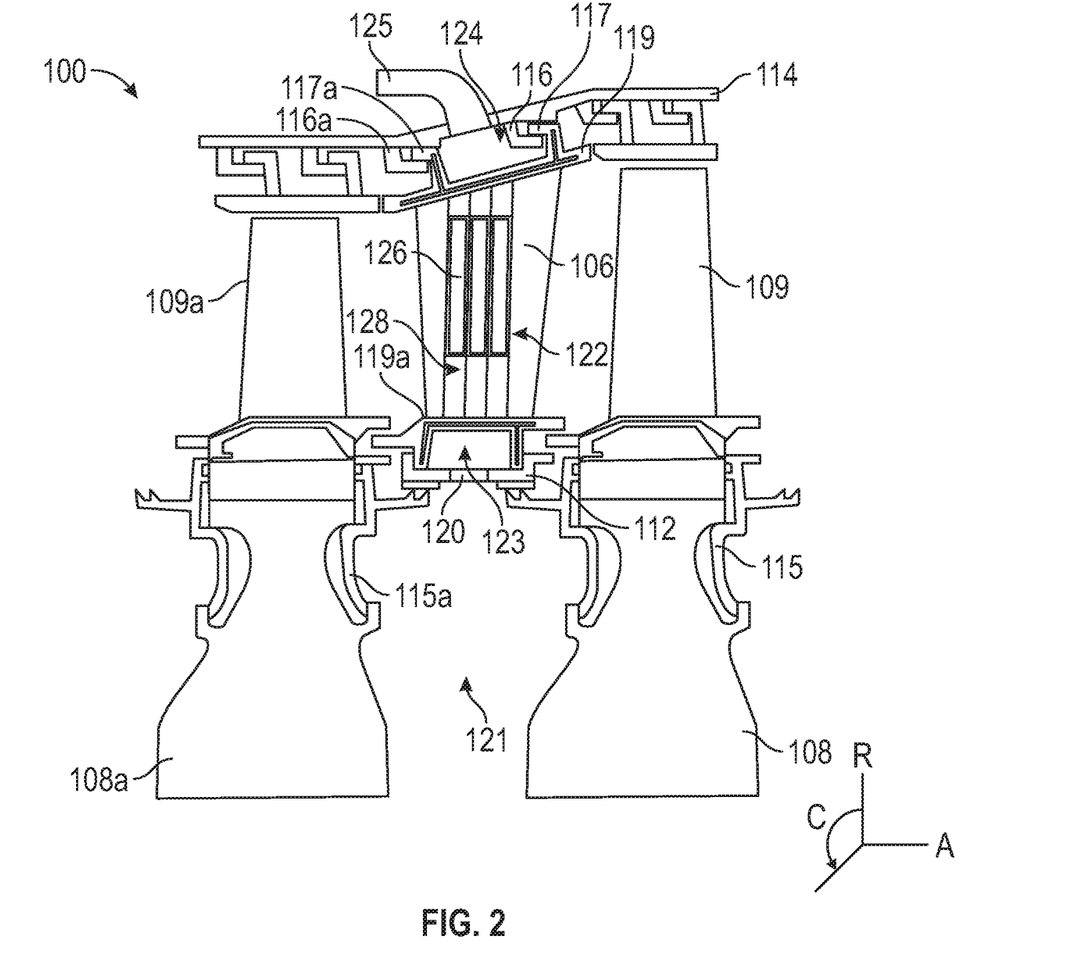
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

Although FIG. 2 depicts a second stage vane, as appreciated by those of skill in the art, embodiments provided herein can be applicable to first stage vanes as well. Such first stage vanes may have cooling flow supplied to the vane at both the inner and outer diameters, as opposed to the through-flow style cavity which goes from, for example, outer diameter to inner diameter. Thus, the present illustrations are not to be limiting but are rather provided for illustrative and explanatory purposes only.

In the present illustration, a turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119, 119a can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting. The TCA conduit 125 may provide cooling air that can flow into the baffles 126 and then impinge from the respective baffle 126 onto an interior surface of the vane 106.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Figure 3A:
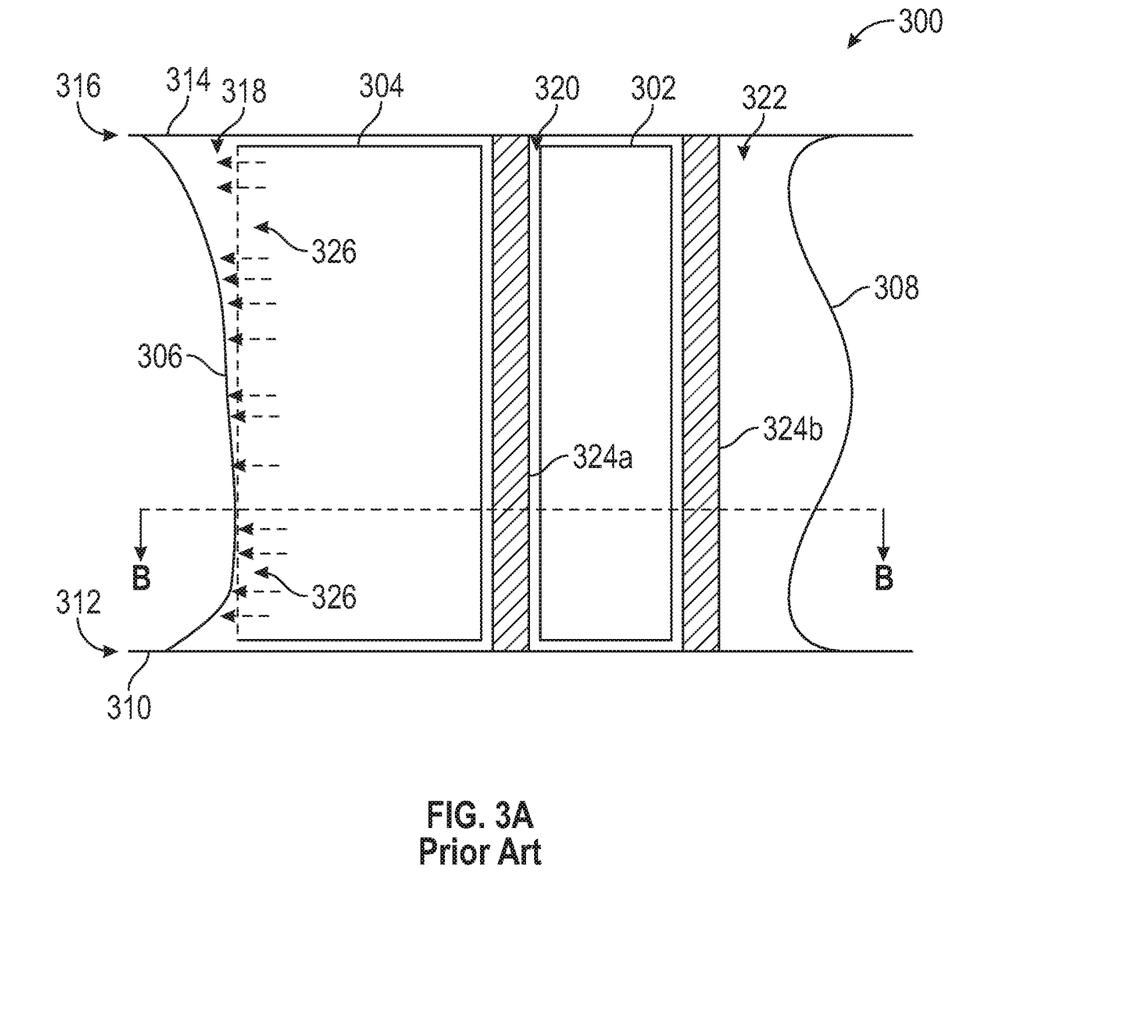
FIG. 3A is an axial cross-section schematic illustration of an airfoil.
Figure 3B:
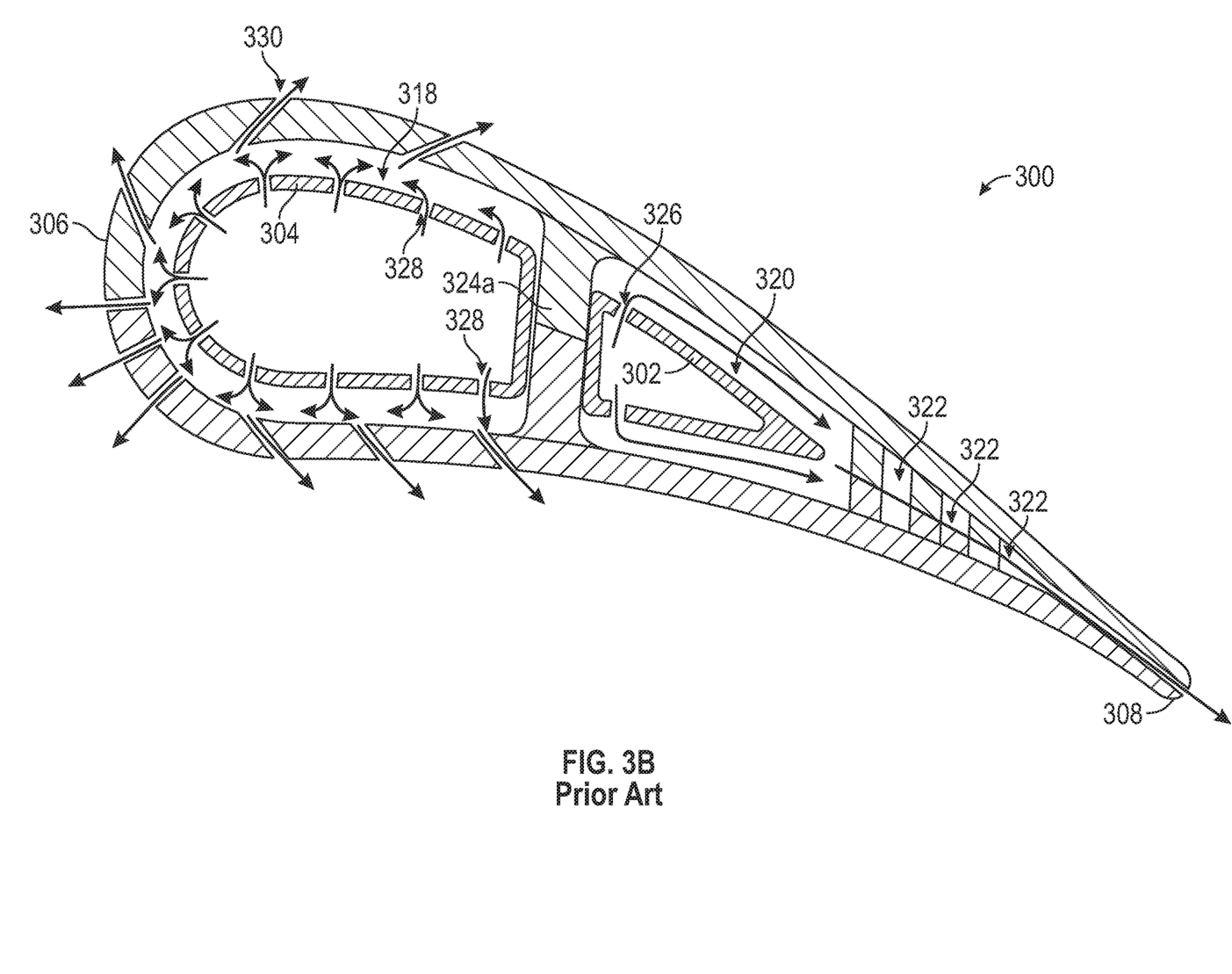
FIG. 3B is a cross-sectional illustration of the airfoil of FIG. 3A as viewed along the line B-B.

Turning now to FIGS. 3A-3B, schematic illustrations of an airfoil 300 having a first baffle 302 and a second baffle 304 installed therein are shown. Each baffle 302, 304 has a baffle body that defines the structure and shape of the respective baffle 302, 304. The airfoil 300 extends in an axial direction between a leading edge 306 and a trailing edge 308. In a radial direction, the airfoil 300 extends between an inner platform 310 at an inner diameter 312 and an outer platform 314 at an outer diameter 316. In this illustrative embodiment, the airfoil 300 has three internal cavities: a leading edge cavity 318, a mid-cavity 320, and a trailing edge cavity 322. Although shown with a specific cavity configuration, those of skill in the art will appreciate that airfoils can have a variety of internal cavity configurations and implement embodiment of the present disclosure. Thus, the present illustration is merely for explanatory purposes and is not to be limiting. FIG. 3A is an axial cross-section illustration of the airfoil 300 illustrating an internal structure thereof. FIG. 3B is a cross-sectional illustration as viewed along the line B-B.

One or more of the cavities 318, 320, 322 may be separated by rib 324 with fluid connections therebetween in some embodiments. The rib 324 extend radially between the inner platform 310 at the inner diameter 312 to the outer platform 314 at the outer diameter 316. A first rib 324 may separate the mid-cavity 320 from the leading edge cavity 318, and may, in some embodiments, fluidly separate the two cavities 318, 320. A second rib may separate the mid-cavity 320 from the trailing edge cavity 322, and may, in some embodiments, have through holes to fluidly connect the mid-cavity 320 to the trailing edge cavity 322. In some embodiments, the cavities 318, 320, 322 may include one or more heat transfer augmentation features, such as trip strips, pedestals, pin fins, etc.

In this embodiment, the leading edge cavity 318 includes a second baffle 304 installed therein and the mid-cavity 320 includes a first baffle 302 therein. The first baffle 302 includes first baffle apertures 326 (shown in FIG. 3B) to supply cooling air from within the first baffle 302 into the mid-cavity 320. The cooling air within the mid-cavity 320 may flow into the trailing edge cavity 322 and subsequently exit the airfoil 300 through a discharge slot of the trailing edge 308. Such discharge slot of the trailing edge 308 may include various internal cooling features to provide an appropriate flow air flow distribution in order to provide adequate thermal cooling effectiveness to achieve local metal temperature, durability life, and aerodynamic performance characteristics. The second baffle 304 includes second baffle apertures 328 where cooling air within the second baffle 304 may impinge upon surfaces of the airfoil 300 of the leading edge cavity 318. The cooling or impinged air may then exit the leading edge cavity 318 through film cooling apertures 330, as will be appreciated by those of skill in the art.

In some airfoils, the leading edge may not include a baffle, but rather may include a leading edge feed cavity and a leading edge impingement cavity, wherein flow from the leading edge feed cavity will flow through impingement apertures to impinge upon an airfoil leading edge hot wall, and then exit the leading edge impingement cavity through an array of film cooling apertures. Aft of the leading edge cavity arrangement may be one or more additional cavities, which typically includes a trailing edge cavity. In such airfoil cooling configuration arrangements, the leading edge is typically supplied cooling air from a high pressure feed source emanating from the high compressor discharge air. The trailing edge, in contrast, may be fed from a lower pressure mid-compressor bleed source. However, utilizing high pressure air may be undesirable from a thermodynamic cycle efficiency perspective. That being said, high pressure air is sometimes required in order to achieve adequate leading edge film cooling hole pressure ratio and back flow margin requirements. Conversely, a mid-compressor bleed feed source may not provide the necessary absolute supply source pressure required to adequately ensure positive outflow through leading edge film cooling apertures. Turbine airfoils subjected to high external heat flux and thermal operating environments typically require an array of leading edge film cooling hole flow apertures in order to enhance the local thermal cooling effectiveness of the airfoil leading region, thereby mitigating premature through-wall oxidation and thermal mechanical fatigue durability failure modes due to excessively high operating metal temperatures incurred during engine operation.

As a result of these design considerations, the utilization of a high supply pressure supply feed source that is used to provide cooling air to the airfoil leading edge feed cavity can result in a significantly higher pressure ratio across the array of leading edge film cooling hole flow apertures than desirable. The leading edge pressure ratio is defined by the ratio of the supply feed pressure and the free stream gaspath total pressure along the airfoil leading edge of the airfoil, commonly referred to as the stagnation pressure. As a result of the high supply pressure feed source and resulting high leading edge pressure ratio, it may be desirable and necessary to "meter" or restrict the cooling air supply pressure in order to meet allocated cooling air flow requirements, as well as, improve the film cooling effectiveness characteristics of the array of leading edge showerhead cooling apertures.

The high leading edge pressure ratio increases the cooling flow rate for a constant exit flow area (i.e., film cooling apertures) resulting in high blowing ratios across the arrays of leading edge film cooling apertures. Although high blowing ratios are desirable to achieve high Reynolds numbers within the film cooling apertures to increase convective cooling, such high blowing ratios may be undesirable from a film cooling perspective. Film cooling apertures with excessively high blowing ratios have a tendency to have poor film cooling characteristics because the cooling flow emanating from the film holes may "blow off" and detach from the airfoil surface. The separation of the film cooling airflow flow induces undesirable mixing between the bot freestream gas and local film cooling air resulting in hot gas entrainment negating the insulating characteristics of the desired "film boundary layer" of cooling air at the surface of the airfoil.

One solution is to meter the cooling air flow from the high pressure cooling supply source. The metering of the pressure may be achieved by introducing a relatively "small" feed orifice in order to reduce or "drop" the high supply pressure source by incurring additional pressure losses resulting from a small inlet feed area and sharped edge sudden contraction that results. However, reducing cooling source pressure in order to achieve a lower leading edge pressure ratio to mitigate cooling high flow rates is not desirable from a convective heat transfer perspective. The lower pressure levels inherently result in a reduction in the absolute level of convective heat transfer and thermal cooling characteristics that are otherwise achievable at a higher pressure level. A small leading edge feed orifice may be undesirable because it may be more prone to plugging from debris within the engine, either from surrounding hardware such as brush seals, w-seals, and/or from dirt/sand particulate that is in the environment that the engine is subjected to in certain parts of the world. Further, in some solutions, due to other considerations, as discussed above, the sourced cooling air/pressure may be underutilized.

Embodiments of the present disclosure are directed to incorporating a leading edge counter flow "space-eater" insert member (e.g., baffle or spar) having axial-extending rib roughened cooling channels proximate the leading portions of an airfoil, comprising the airfoil pressure surface, suction surface, and leading edge. In various embodiments, a predominantly axial channel flow area may be formed between an exterior of the insert member and/or spar and the interior surfaces of the airfoil. The axial channel passage flow area formed between the spar/baffle and the airfoil internal wall surfaces may be tailored in both the radial and stream wise directions in order to optimize the internal convective heat transfer, pressure loss, and cooling air temperature heat up based on local external heat flux and thermal cooling effectiveness requirements. The axial cooling channel passage flow area may be constant, converging, and/or diverging in the streamwise direction. The local cooling channel passage flow area may be controlled by variable axial rib heights, widths, and/or orientations of such ribs. As discussed herein, the term "axial" refers to a direction relative to an engine axis, when the airfoil is installed within such engine (e.g., as shown in FIG. 2). The axial direction is a direction between a leading edge and a trailing edge of the airfoil, with a forward flow direction being a direction from the trailing edge toward the leading edge (an aft flow direction is a direction from the leading edge toward the trailing edge).

The space-eater insert member and/or spar, of the present disclosure, provides for a counter-flow (i.e., aft-to-forward flow) cooling concept in which a high pressure feed source can be leveraged by managing pressure losses within the cooling system in order to provide more efficient and effective use of cooling airflow for improved convective and film cooling of the airfoil. Optimization or control of pressure loss within the cooling design, in accordance with embodiments of the present disclosure, may be achieved through various heat transfer features and orifices arranged on and/or formed in the insert member. For example, a leading edge space-eater insert member feed and/or resupply flow aperture (e.g., size and shape thereof) may be tailored specifically for each pressure side and suction side axial flow channel passaged formed between the insert member and/or spar and airfoil walls in order to optimize both the radial and axial cooling air flow distribution in each of the axial flow channel passages. Axial channel passage flow area, Mach number, and internal convective cooling design features other than those illustrated within the present disclosure may be utilized to achieve desired local convective cooling characteristics. Internal geometry features including, but not limited to, turbulators, trip strips, pin fins, dimples, pedestals, etc. may be integrated either independently and/or concurrently. The type of features may be tailored, as desired. For example, the type of trip strip (i.e., normal, skewed, chevron, discrete chevron, w-shaped, discrete w-shaped, etc.), streamwise pitch, height, and spacing are design methods that may be utilized to create a desired cooling flow distribution, pressure loss, and heat pickup through the axial cooling channel passages of the present disclosure.

In addition to the above considerations, turbine airfoils may be required to endure high inlet temperatures with reductions in dedicated cooling flow due to associated cycle penalties. One way of accomplishing this is through the use of higher temperature capable materials such as ceramic matrix composites (CMCs) which can operate hundreds of degrees in excess of Ni-base super-alloys. However, due to the manufacturing process of CMCs, whether they are created by unidirectional tapes or woven fabrics, heat transfer augmentation features such as trip strips or pedestals cannot readily be created. Without the process capability to manufacture such internal cooling geometric features commonly fabricated from conventional core die and investment casting manufacturing methods, turbine components made from CMC materials currently rely on limited passive internal convective heat transfer augmentation methods produced by the local surface roughness associated with various CMC wave patterns and ply lay-ups. Alternatively, enhances backside convective heat transfer may be achieved by incorporating internal baffles with distributed arrays of impinging cooling flow apertures. Typically, impingement cooling designs require a significant amount of cooling flow in order to be effective, which may be difficult or inefficient to supply to the airfoils. Additionally, the locally high internal convective heat transfer generated from impinging flow cooling design concepts may result in large through-wall and in-plane thermal temperature gradients which are not conducive to the relatively low proportional strain limits of the CMC material capability.

The end goal of allotted cooling flow reduction for CMC components also forces departures from traditional internal cooling circuit design. Traditionally, components with leading edge baffle inserts will incorporate impingement cooling through the baffle with large amounts of film to pull flow out of the cavity and maintain a jetting effect from the impingement holes. With reductions in cooling flow, multiple rows of film cooling apertures would not be feasible. Without a constant internal purge, internal heat transfer from impingement holes would approach that of traditional channel flow, severely limiting the ability to cool the part.

In view of the above, embodiments of the present disclosure are directed to the incorporation of a leading edge space-eater insert member with segregated axial rib roughened cooling channels placed on the external surface of the insert member. The axial channel flow area in the axial streamwise direction may be constant, converging, and/or diverging, and may be controlled by variable rib heights on the insert member. Accordingly, an insert member, as described herein, may be implemented with a CMC formed airfoil.

Figure 4:
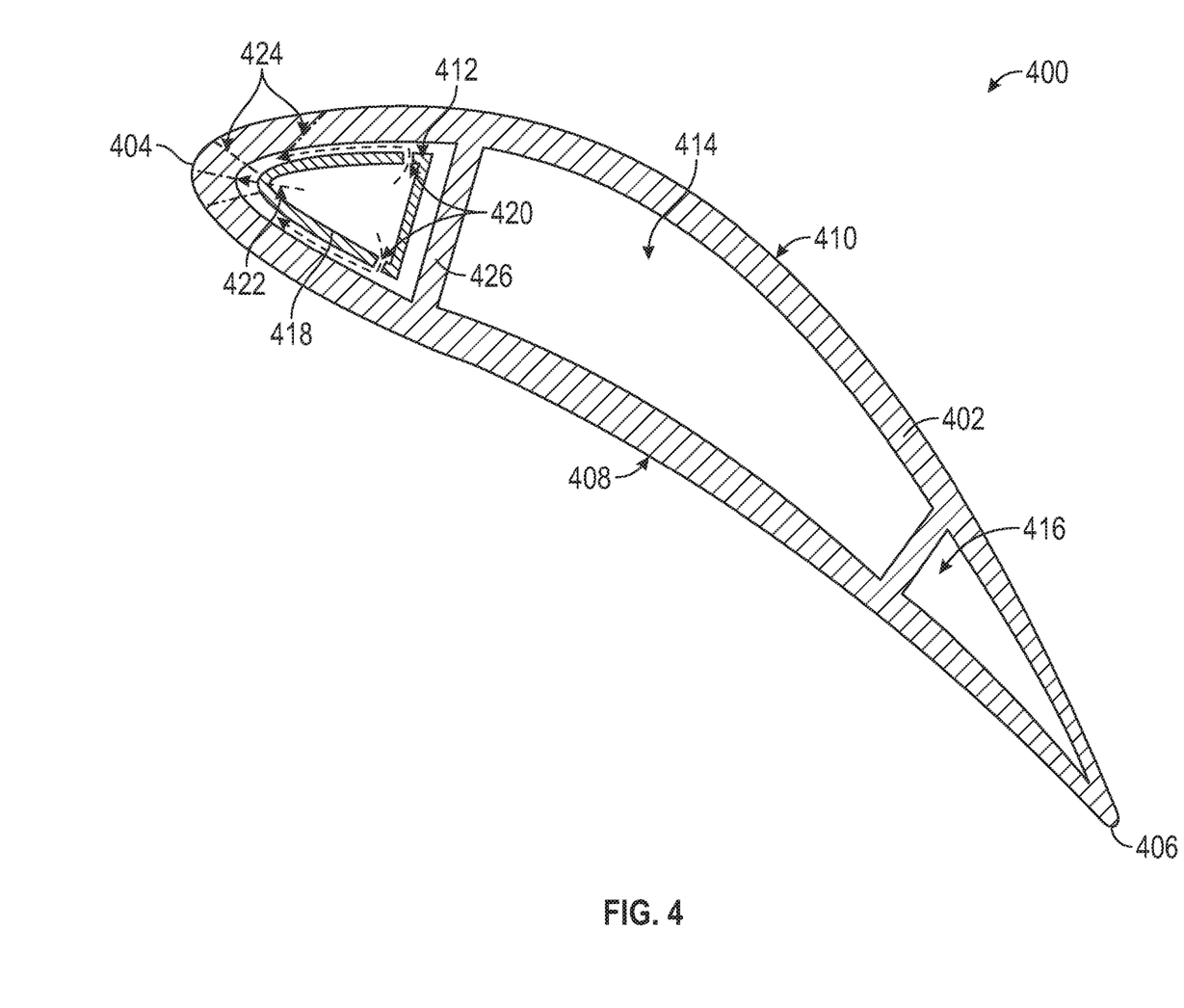
FIG. 4 is a schematic illustration of an airfoil in accordance with an embodiment of the present disclosure.

Turning to FIG. 4, a schematic illustration of an airfoil 400 in accordance with an embodiment of the present disclosure is shown. The airfoil 400 has an airfoil body 402 formed from CMC or other similar high-temperature material. Due to this, the airfoil 400 cannot include internal features, such as heat transfer augmentation features (e.g., trip strips, pedestals, etc.). However, the airfoil 400, due to the CMC construction of the airfoil body 402, may be placed in a gas environment with temperatures above the capability of the material, and thus a cooling scheme must be provided. The airfoil body 402 defines a leading edge 404, a trailed edge 406, a pressure side 408, and a suction side 410. Furthermore, the airfoil body 402 defines a number of internal cavities which are configured to enable cooling of the material of the airfoil body 402. In this illustrative embodiment, a leading edge cavity 412, a mid-chord cavity 414, and a trailing edge cavity 416 are defined within the interior of the airfoil body 402. Although schematically shown with three internal cavities, those of skill in the art that airfoils implementing embodiments described herein may utilize and incorporate various alternative design concepts and cooling configurations and arrangements (e.g., numbers, shapes, orientations, etc.) of the internal cavities.

The leading edge 404 of the airfoil 400 will be subject to the highest temperature air during operation. Accordingly, an efficient cooling scheme is required to properly cool the component and improve the cooling characteristics and durability capability of the airfoil component fabricated from CMC and/or other similar high temperature material. In this embodiment of the present disclosure, the airfoil 400 includes an insert member 418 is installed within the leading edge cavity 412. The insert member 418 may be a space-eater baffle or a spar structure that is inserted into the leading edge cavity 412. The insert member 418 is configured to receive a cooling flow of air, and then supply such cooling flow of air along internal surfaces of the leading edge cavity 412 and/or supply such cooling flow as an impingement flow in order to enhance the backside convective heat transfer at the airfoil leading edge 404 of the leading edge cavity 412.

The insert member 418 is configured with one or more metering flow apertures 420 located at an aft end of the insert member 418 (i.e., away from the leading edge 404). The metering flow apertures 420 are arranged to supply cooling air into one or more axial extending flow cooling passages or channels that extend from the location of the metering flow apertures 420 in a forward streamwise direction toward the leading edge 404 within the leading edge cavity 412. The axial extending flow cooling passages or channels extend along interior surfaces of the airfoil body 402 and external to the insert member 418. The insert member 418 may also include, as shown, one or more leading edge impingement apertures 422. As such, a portion of the cooling flow within the insert member 418 may impinge upon the internal surfaces of the airfoil body 402 along the leading edge 404 of the leading edge cavity 412. Also illustratively shown, the airfoil body 402 may include one or more film cooling apertures 424 (e.g., holes, apertures, slots, through-holes, etc.). The film cooling apertures 424 may act as an conduit and enable a pressure differential to be created in order to draw the cooling airflow from the interior of the insert member 418, through the metering flow apertures 420 and/or the impingement apertures 422 and into the leading edge cavity 412 to both convectively cool and film cool the material of the airfoil body 402. The film cooling apertures 424 may be, in some embodiments, showerhead and/or gill row holes, as will be appreciated by those of skill in the art.

In additional to the relative arrangement and structure shown in FIG. 4, the insert member 418 may also include various external features. These external features of the insert member 418 are provided to accommodate the inability to form such features from the material of the airfoil body 402. The external features of the insert member 418 can include, without limitation, trip strips and axial ribs. Other external features may include, for example, pedestals, various geometry trip strips, pin fins, and/or spherical and/or non-spherical protrusions, dimples/divots, etc. Axially extending ribs may be formed along the exterior surface of the insert member 418, creating and forming axially extending channels defined along and/or between axially extending ribs. The other external features, such as heat transfer augmentation features (e.g., pedestals, various geometry trip strips, pin fins, and/or spherical and/or non-spherical protrusions, dimples/divots) may be arranged within or along the axially extending channels and are arranged to control or modify thermal transfer from the hot exterior walls of the airfoil body 402 to the cooling flow of air. In addition to better control both radial and axial distribution of cooling air flow within the leading edge cavity 412 and along hot walls of the airfoil 400, the axially extending ribs may be configured to contact the interior surfaces of airfoil body 402 such that the axially extending ribs position and retain the insert member 418 within the leading edge cavity 412. The position of the insert member 418 within the leading edge cavity may be such that the insert member 418 contacts a separate rib 426 that is part of the airfoil body 402 or engaged with such separator rib 426 by one or more stand-off structures. That is, an aft end or portion of the insert member 418 may contact the separator rib 426 to retain the insert member 418 in an axial direction within the airfoil 400.

As such, in accordance with embodiments of the present disclosure, a cooling flow may enter in the middle of the insert member and subsequently exit out through metering flow apertures proximate an aft section of the leading edge cavity. This flow will enter into, optionally segregated, axial flow cooling passages. The cooling flow will then travel forward (i.e., toward the leading edge) and is then resupplied by impingement holes or apertures proximate the leading edge region of the insert member. The combined flow is expelled out of film cooling apertures.

Figure 5:
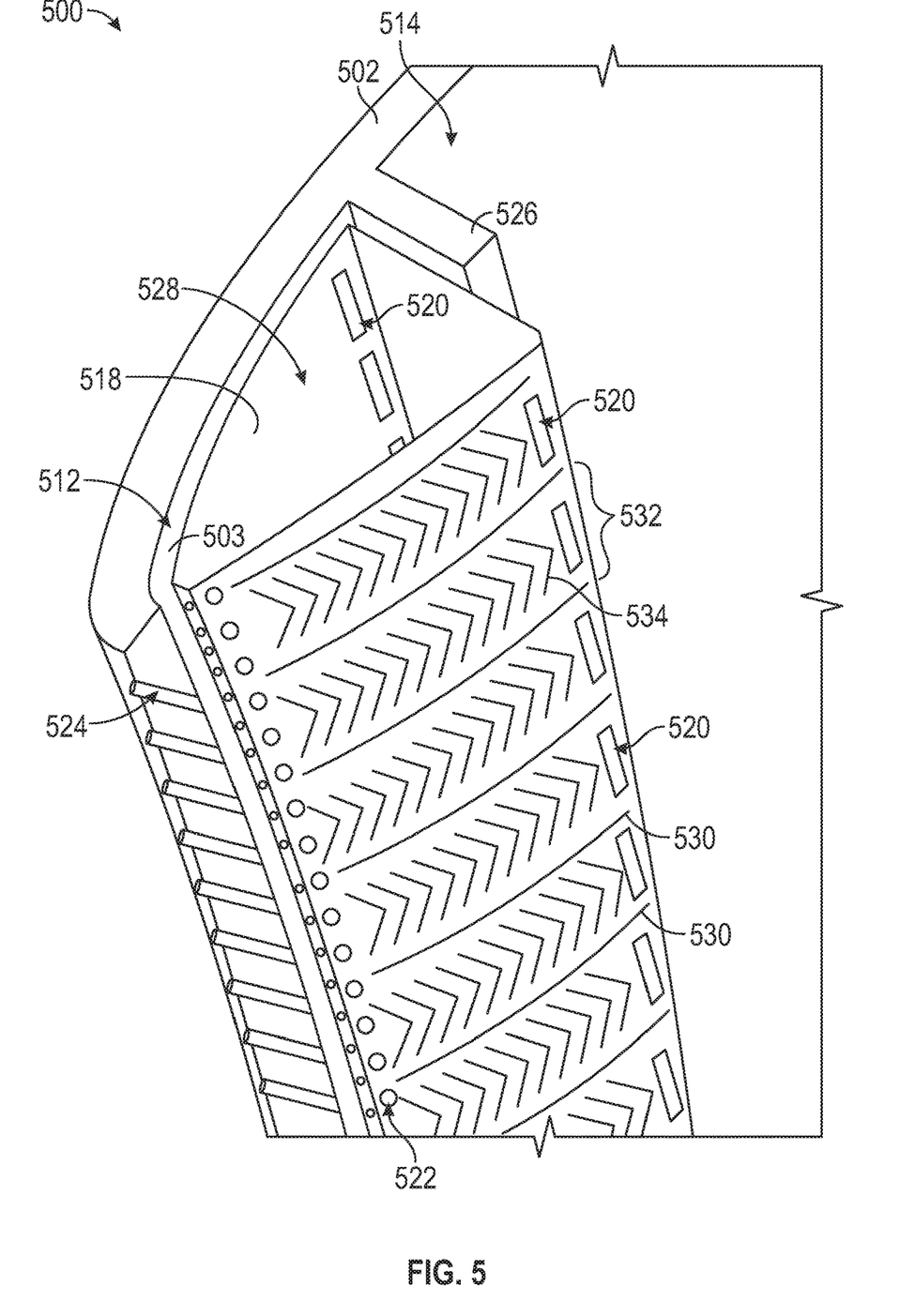
FIG. 5 is a partial cut-away schematic illustration of an airfoil in accordance with an embodiment of the present disclosure.

Turning now to FIG. 5, a partial cut-away schematic illustration of an airfoil 500 in accordance with an embodiment of the present disclosure is shown. The airfoil 500 has an airfoil body 502 formed from CMC or other similar high-temperature material, and may be substantially similar to that shown in FIG. 4. The airfoil body 502 includes a leading edge cavity 512 and a midchord cavity 514 aft of the leading edge cavity 512 and separated therefrom by a separator rib 526. An insert member 518 is installed within the leading edge cavity 512. An aft end of the insert member 518 may contact, engage, or otherwise be supported by the separator rib 526.

The insert member 518 includes metering flow apertures 520 proximate an aft end of the insert member 518 and leading edge impingement apertures 522 at a forward end of the insert member 518. The metering flow apertures 520 and the leading edge impingement apertures 522 provide fluid communication through the structure of the insert member 518 from an internal insert cavity 528 to an external area or volume (i.e., the leading edge cavity 512 of the airfoil 500). The insert member 518 further includes, in this illustrative embodiment, a plurality of axially extending ribs 530. The axially extending ribs 530 define axially extending channels 532 between or along the axially extending ribs 530. In some embodiments, the axially extending ribs 530 may provide two different functions. First, the axially extending ribs 530 may aid in channeling cooling flow from the aft end (metering flow apertures 520) toward the leading edge/forward end of the insert member and along the hot walls of the airfoil 500. Second, the axially extending ribs 530 may be configured to contact and/or engage with internal surfaces of the airfoil body 502 within the leading edge cavity 512 to support and position the insert member 518 therein. In some embodiments, a portion of the total number of axially extending ribs 530 may provide one or more functions and another portion of the total number of axially extending ribs 530 may provide only a single function (e.g., channeling cooling flow or support/engagement) depending on the configurations thereof.

As shown, the insert member 518 includes heat transfer augmentation features 534 arranged within and along the axially extending channels 532 between the axially extending ribs 530. The heat transfer augmentation features 534 are formed on an exterior surface of the insert member 518. In some embodiments, the heat transfer augmentation features 534 are integrally formed with the insert member 518 (e.g., from a single piece or material). In other embodiments, the heat transfer augmentation features 534 may be added or attached to the exterior surface of the insert member 518 after manufacturing of the insert member 518. As shown in this illustrative embodiment, the heat transfer augmentation features 534 are formed as chevron trip strips. As cooling air flows through the axially extending cooling passages or channels 532, the heat transfer augmentation features 534 may direct the cooling air toward the axially extending ribs 530 in order to provide additional convective cooling thereto.

Also shown, the insert member 518 includes a plurality of leading edge impingement apertures 522 arranged along a leading edge or forward end of the insert member 518. The leading edge impingement apertures 522 are arranged and positioned to enable an impingement cooling of a leading edge of the airfoil 500. Further, in some embodiments, the leading edge impingement apertures 522 may provide a resupply of cooling air into the leading edge cavity 512.

Subsequently, the cooling air may flow through one or more film cooling apertures 524 located at or proximate to the leading region edge of the airfoil 500. As the air exits through the film cooling apertures 524, a film of air may be formed on the exterior surface of the airfoil 500 to provide additional cooling thereto, as appreciated by those of skill in the art.

In accordance with some embodiments of the present disclosure, the insert members of the present disclosure may be formed from sheet metal. Due to various methodologies of manufacturing high temperature composites (e.g., CMCs) used for forming unique airfoils for high temperature applications, heat transfer augmentation features cannot be placed on internal surface of the airfoil. To promote turbulence in the near-wall region of the airfoil, trip strips or other heat transfer augmentation features are placed on a metallic insert member which can be cast or formed of sheet metal. Axially extending ribs enable an offset from the internal surfaces of the airfoil wall while providing channel flow for trip strips. Further, as discussed above, impingement holes or apertures at the leading edge of the insert member act as resupply to prevent ingestion and allow for higher convective heat transfer along the interior surface 503 of the airfoil body 502 at portions of the leading edge cavity 512 where required. Although shown and described above as a baffle-type configuration, embodiments of the present disclosure are not so limited.

Figure 6:
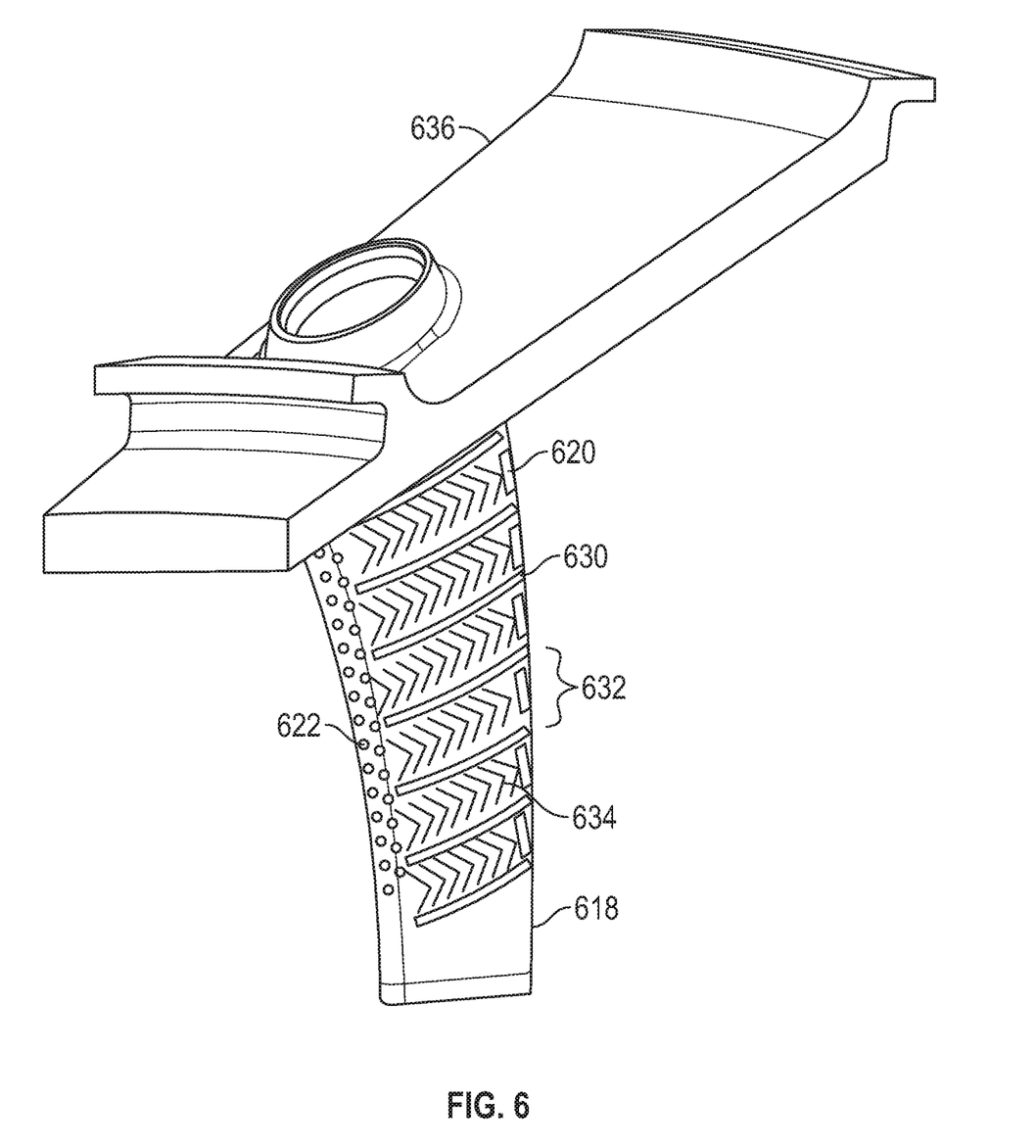
FIG. 6 is a schematic illustration of an insert member in accordance with an embodiment of the present disclosure.

For example, turning now to FIG. 6, an insert member 618 in accordance with an embodiment of the present disclosure is shown. The insert member 618 is similar to that shown and described above, but rather than be a baffle-type insert, the insert member 618 is arranged as a spar-type insert. The space-eater insert member 618 described herein provides both structural support and a means by which to generate enhances internal convective cooling for airfoil design concepts produced from CMC or other similar high temperature materials. As such, as shown, the insert member 618 is integrally formed with a platform 636. The insert member 618 may be inserted within a shell of an airfoil (e.g., airfoil body) fabricated from CMC or other similar high temperature materials. That is, the insert member 618 is a separate component, element, or structure, and the airfoil body is not shown in FIG. 6 for clarity—although such configuration would look similar to that shown and described above.

The integration of a high strength Ni- and/or Cobalt based super-alloy spar-type design concept may also be leveraged to enhance the internal heat transfer and thermal cooling effectiveness of the CMC or other similar high temperature material comprising the airfoil shell. In this sense, the incorporation of conventional cooling design features along the surface of the spar-type member enables for improved convective cooling characteristics. The spar-type member or insert may be manufactured using traditional core die tooling and investment casting methods, which enables the fabrication of conventional internal convective cooling features that may include, but are not limited to, continuous and/or segregated ribs, turbulators, trip strips, pedestals, pin fins, and/or spherical and non-spherical protrusions, or dimples/divots, teardrops, etc.

The insert member 618 includes external features as described above, including, axially extending ribs 630, axially extending channels 632 defined therebetween, metering flow apertures 620 proximate an aft end of the insert member 618, and leading edge impingement apertures 622 at a forward end of the insert member 618. Further, one or more heat transfer augmentation features 634 may be formed on an exterior or external surface of the insert member 618. The insert member 618 may be integrally formed with the platform 636, and may be formed by traditional manufacturing processes (e.g., casting) or may be additively manufactured. The insert member 618 and/or the platform 636 may be formed from various metal alloys, as known in the art, including, without limitation, nickel-based super alloys, cobalt-based super alloys, etc. The insert member 618, in combination with the platform 636, may additionally provide structural support for the CMC airfoil shell body. That is, the insert member 618 may function as a structural spar.

Advantageously, by placing the internal turbulence generating features on the insert member, traditional manufacturing methodologies can be leveraged to improve the cooling technology used in conjunction with high temperature materials such as CMCs for airfoils used in gas turbine engines. The insert member is configured such to create a counter-flow cooling concept in which more consistent and distributed internal convective heat transfer can be leveraged as opposed to direct impingement. The counter-flow cooling configuration is achieved by having the metering flow apertures proximate an aft end of the insert member. Flow will pass through the metering flow apertures, and then flow forward toward the leading edge, which is contrary to typical cooling schemes. The placement of trip strips within the axially extending channels on the exterior surface walls of the spar-type insert member also may serve to enhance the convective heat transfer in the low aspect ratio cooling passage channels formed between the spar-type insert member and the exterior CMC airfoil walls. The cooling air flow vorticity generated by the trip strip features along the spar-type insert promote increased mixing and turbulence along the opposite proximate interior surface of the CMC exterior airfoil wall, thereby enhancing the local convective heat transfer and thermal cooling effectiveness required to achieve the desired absolute CMC material through-wall and in-plane temperature gradients required for optimal durability capability.

The embodied concept details how adequate internal static pressure can be achieved in order to maintain positive out flow margin in the film cool holes or flow apertures (e.g., showerhead cooling holes, supply feeds). Between the sizing of the supply metering flow apertures and the impingement holes at the leading or forward edge, respective pressure drops can be managed and tailored while providing optimal internal convective heat transfer and required local thermal cooling effectiveness necessary to achieve CMC or similar high temperature material component durability and cycle efficiency performance requirements.

Although the various above embodiments are shown as separate illustrations, those of skill in the art will appreciate that the various cooling design features can be combined, mixed, and matched in order to produce an airfoil cooling design configuration having the desired functional thermal cooling performance that is enabled by one or more features described herein. Thus, the above described embodiments are not intended to be distinct arrangements and structures of airfoils, but rather are provided as separate embodiments for clarity and ease of explanation.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, the component comprising:
   an airfoil body having a leading edge, a trailing edge, a pressure side, and a suction side, wherein the airfoil defines at least a leading edge cavity located proximate the leading edge and defined between the leading edge and a separator rib of the airfoil body in an axial direction and between the pressure side and the suction side in a circumferential direction;
   a counter-flow insert member installed within the leading edge cavity, the insert member having one or more metering flow apertures along a pressure side of the insert member and along a suction side of the insert member and proximate an aft end of the insert member and one or more leading edge impingement apertures at a forward end of the insert member, wherein the insert member is in contact with an supported by the separator rib at the aft end of the insert member; and
   a plurality of axially extending and parallel ribs extending along an exterior surface of the insert member from the aft end of the insert member to the forward end of the insert member;
   wherein a plurality of segregated and axial extending flow channel passages are defined between the plurality of axial extending ribs and between the exterior surface of the insert member and an interior surface of the airfoil body and extending from the aft end of the insert member to the forward end of the insert member in an axial direction, and wherein the plurality of axial extending ribs are configured to contact the interior surface of the airfoil body to position the insert member within the leading edge cavity and to define the plurality of axial extending flow channel passages, and
   wherein air flow flows from an internal insert cavity of the insert member, through the one or more metering flow apertures at the aft end of the insert member, into the plurality of axial extending flow channel passages, and flows forward through the plurality of axial extending flow channel passages toward the leading edge of the airfoil body, and
   at least one film cooling aperture formed on the leading edge of the airfoil body to fluidly connect the leading edge cavity to an exterior of the airfoil body, wherein the at least one film cooling aperture causes a pressure differential to draw the airflow through the metering flow apertures at the aft end of the insert member toward the leading edge of the airfoil, and wherein the flow through the one or more metering flow apertures and the flow through the one or more impingement apertures combines at the leading edge with the air from the one or more impingement apertures resupplying the air from the one or more metering flow apertures and then expelled through the at least one film cooling aperture,
   wherein the plurality of axial extending flow channel passages do not include fluid connection to the interior of the insert member at locations between the one or more metering flow apertures and the one or more leading edge impingement apertures.

2. The component of claim 1, further comprising at least one heat transfer augmentation feature formed on the exterior surface of the insert member and within at least one axial extending flow channel passage of the plurality of axial extending flow channel passages.

3. The component of claim 1, wherein each axial extending rib has a variable radial height in a direction from the aft end to the forward end.

4. The component of claim 1, wherein the airfoil body is formed of ceramic matrix composites.

5. The component of claim 1, wherein the insert member is a baffle inserted into the airfoil body.

6. The component of claim 1, wherein the insert member is a structural spar inserted into the airfoil body.

7. The component of claim 6, wherein the insert member is integrally formed with a platform.

8. The component of claim 1, wherein the insert member is formed from sheet metal.

9. The component of claim 1, wherein the ribs extend from an aft end of the ribs at the aft end of the insert to a forward end of the ribs at the forward end of the insert.

10. A gas turbine engine comprising:
    an airfoil having an airfoil body defining a leading edge, a trailing edge, a pressure side, and a suction side, wherein the airfoil defines at least a leading edge cavity located proximate the leading edge and defined between the leading edge and a separator rib of the airfoil body in an axial direction and between the pressure side and the suction side in a circumferential direction;
    a counter-flow insert member installed within the leading edge cavity, the insert member having one or more metering flow apertures along a pressure side of the insert member and along a suction side of the insert member and proximate an aft end of the insert member and one or more leading edge impingement apertures at a forward end of the insert member, wherein the insert member is in contact with an supported by the separator rib at the aft end of the insert member; and
    a plurality of axially extending and parallel ribs extending along an exterior surface of the insert member from the aft end of the insert member to the forward end of the insert member;

wherein a plurality of segregated and axial extending flow channel passages are defined between the plurality of axial extending ribs and between the exterior surface of the insert member and an interior surface of the airfoil body and extending from the aft end of the insert member to the forward end of the insert member in an axial direction, and wherein the plurality of axial extending ribs are configured to contact the interior surface of the airfoil body to position the insert member within the leading edge cavity and to define the plurality of axial extending flow channel passages, and wherein air flow flows from an internal insert cavity of the insert member, through the one or more metering flow apertures at the aft end of the insert member, into the plurality of axial extending flow channel passages and flows forward through the plurality of axial extending flow channel passages toward the leading edge of the airfoil body, and at least one film cooling aperture formed on the leading edge of the airfoil body to fluidly connect the leading edge cavity to an exterior of the airfoil body, wherein the at least one film cooling aperture causes a pressure differential to draw the airflow through the metering flow apertures at the aft end of the insert member toward the leading edge of the airfoil, and wherein the flow through the one or more metering flow apertures and the flow through the one or more impingement apertures combines at the leading edge with the air from the one or more impingement apertures resupplying the air from the one or more metering flow apertures and then expelled through the at least one film cooling aperture, wherein the plurality of axial extending flow channel passages do not include fluid connection to the interior of the insert member at locations between the one or more metering flow apertures and the one or more leading edge impingement apertures.

11. The gas turbine engine of claim 10, further comprising at least one heat transfer augmentation feature formed on the exterior surface of the insert member and within at least one axial extending flow channel passage of the plurality of axial extending flow channel passages.

12. The gas turbine engine of claim 10, wherein each axial extending rib has a variable radial height in a direction from the aft end to the forward end.

13. The gas turbine engine of claim 10, wherein the airfoil body is formed of ceramic matrix composites.

14. The gas turbine engine of claim 10, wherein the insert member is a baffle inserted into the airfoil body.

15. The component of claim 10, wherein the insert member is a structural spar inserted into the airfoil body.

16. The gas turbine engine of claim 15, wherein the insert member is integrally formed with a platform.

* * * * *